United States Patent [19]

Eltomi

[11] Patent Number: 5,258,171
[45] Date of Patent: Nov. 2, 1993

[54] METHOD OF PRODUCING CHLORINE DIOXIDE IN A GASEOUS STREAM AND APPARATUS THEREFOR

[75] Inventor: Sam F. Eltomi, Kansas City, Mo.

[73] Assignee: Ashland Oil, Inc., Russell, Ky.

[21] Appl. No.: 500,659

[22] Filed: Mar. 28, 1990

[51] Int. Cl.$^5$ .............................................. C01B 11/02
[52] U.S. Cl. ...................................................... 423/477
[58] Field of Search ......................................... 423/477

[56] References Cited

U.S. PATENT DOCUMENTS

| | | | |
|---|---|---|---|
| 4,013,761 | 3/1977 | Ward et al. | 423/477 |
| 4,143,115 | 3/1979 | Ward et al. | 422/113 |
| 4,234,446 | 11/1980 | Ramras | 423/477 |
| 4,247,531 | 1/1981 | Hicks | 423/477 |
| 4,251,224 | 2/1981 | Cowley et al. | 423/477 |
| 4,590,057 | 5/1986 | Hicks | 423/477 |

FOREIGN PATENT DOCUMENTS 1088935 3/1956 Fed. Rep. of Germany ...... 423/477

OTHER PUBLICATIONS

Ullmann's Encyclopedia of Industrial Chemistry, vol. A 6, Ceramics to Chlorohydrins.

*Primary Examiner*—John Niebling
*Assistant Examiner*—Brian M. Bolam
*Attorney, Agent, or Firm*—Marc C. Pawl

[57] ABSTRACT

The invention relates to a method and apparatus for generating chlorine dioxide in a reaction medium comprising a flowing gaseous carrier stream thereby providing chlorine dioxide having a low water content for use in oxidizing treatment applications which are sensitive to water. The method of the invention uses a mineral acid, such as hydrochloric acid, a hypochlorite salt, such as sodium hypochlorite salt and a chlorite salt, such as sodium chlorite salt, as reactants for generating $ClO_2$. Air is the preferred gaseous carrier stream.

12 Claims, 1 Drawing Sheet

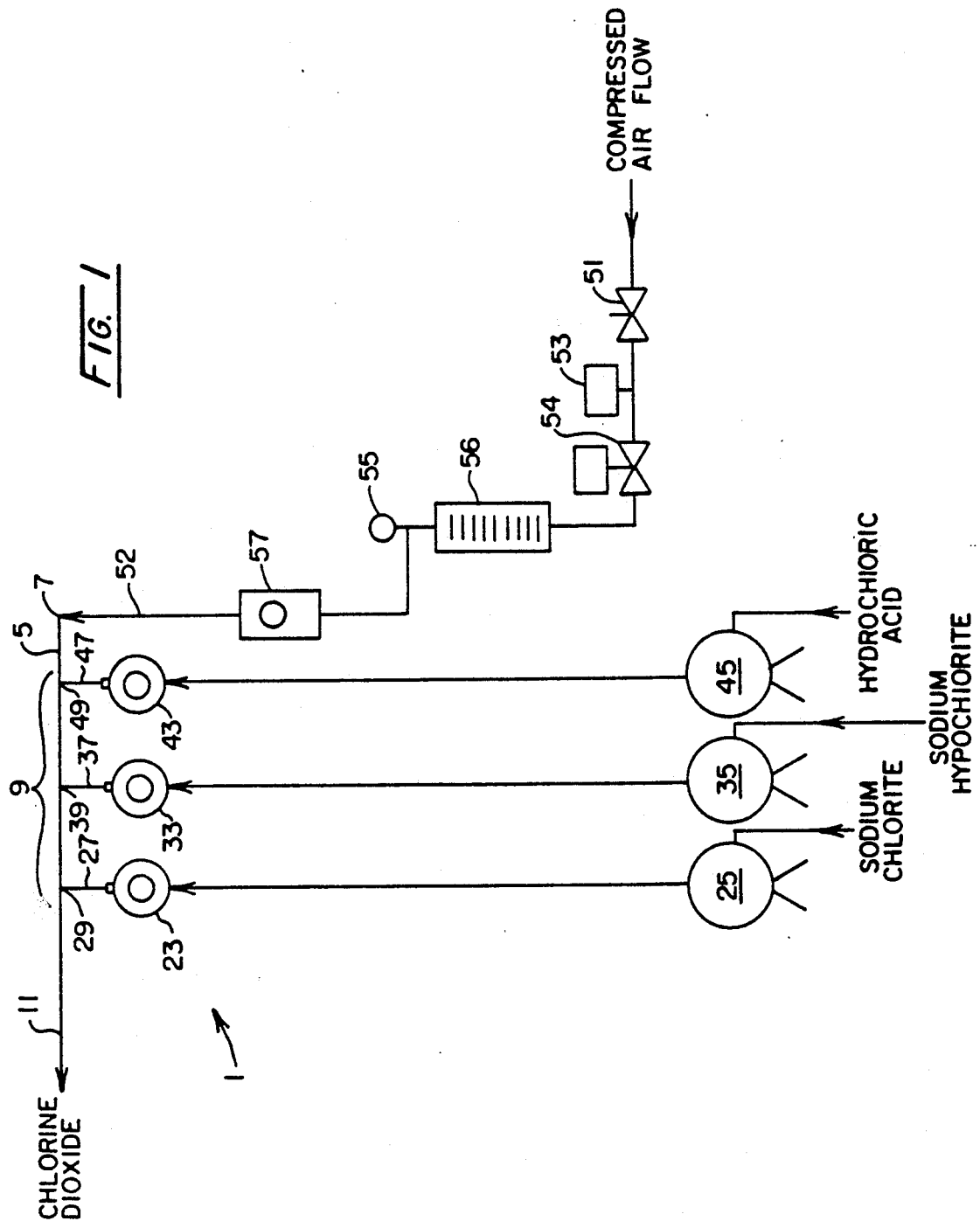

METHOD OF PRODUCING CHLORINE DIOXIDE IN A GASEOUS STREAM AND APPARATUS THEREFOR

FIELD OF THE INVENTION

The present invention relates to a method and apparatus for generating chlorine dioxide in a gaseous stream, preferably a stream of air, without requiring further dilution of the reactants or reaction products with liquids, such as water.

BACKGROUND OF THE INVENTION

It has long been known in the art that chlorine dioxide has great utility as an oxidizing treatment having a variety of applications. Chlorine dioxide has found use in the paper industry as a bleaching agent for paper pulp, in the water and waste treatment industry as a biocide particularly effective against bacteria and algae, in the fat rendering and tallow industry as both a biocide and bleaching agent and generally as an oxidant useful in destroying certain organic materials, such as phenols.

Numerous methods of generating chlorine dioxide and equipment related thereto have become well known throughout the industry, as set forth in *Ullmann's Encyclopedia of Industrial Chemistry*, Volume A 6, pages 496–500. One method of particular importance involves the reaction of a mineral acid with an alkaline metal hypochlorite salt and an alkaline metal chlorite salt. This method will be referred to herein as the mineral acid - hypochlorite salt - chlorite salt route.

The mineral acid - hypochlorite salt - chlorite salt route follows the general formula:

$$2H^+M + 2AClO_2 + AOCl \rightarrow 2ClO_2 + 3A\text{-salt} + H_2O$$

wherein $H^+M$ represents one or more mineral acids, for example, acids selected from the group consisting of HCl, $H_2SO_4$, $HNO_3$, and $H_3PO_4$; A represents one or more alkaline earth metals, for example, those metals found in Group 1A of the Periodic Table, i.e., metals selected from the group consisting of lithium, sodium, potassium, rubidium, cesium and francium; and A-salt represents the alkaline metal product salt or salts formed in the reaction.

More specifically, the hypochlorite salts are selected from the group consisting of NaOCl, LiOCl, KOCl, RbOCl, CsOCl and FrOCl. By far, NaOCl is the most preferred alkaline metal hypochlorite salt reactant. The chlorite salts are selected from the group consisting of $NaClO_2$, $LiClO_2$, $KClO_2$, $RbClO_2$, $CsClO_2$ and $FrClO_2$. By far, $NaClO_2$ is the most preferred alkaline metal chlorite salt reactant.

A-salts are formed by the combination of the alkaline metals dissociated from the hypochlorite and chlorite reactant salts and (1) the anion contributed by the mineral acid; and (2) an anion (a chloride ion) contributed by the hypochlorite and/or chlorite salts. It is believed that the hypochlorite is the predominant chloride ion contributor of the two reactant salts.

It will be recognized by those of average skill in the art that reactant salts having mixed alkaline metals will produce a mixed alkaline metal A-salt product. Furthermore, use of $H_2SO_4$, $HNO_3$, and $H_3PO_4$ as the mineral acids will result in a mixture of A-salt products due to the mineral acids contributing anions other than $Cl^-$.

The most preferred reactants for use in the reaction route discussed hereinabove are hydrochloric acid, sodium hypochlorite and sodium chlorite. Thus the general formula for the reaction route wherein the most preferred reactants are employed is:

$$2HCl + 2NaClO_2 + NaOCl \rightarrow 2ClO_2 + 3NaCl + H_2O.$$

Heretofore, the mineral acid - hypochlorite salt - chlorite salt route for generating chlorine dioxide required the addition of large quantities of water to keep the alkaline salt by-products of the generation process in solution and also to cool the reaction.

U.S. Pat. No. 4,013,761 describes in detail a mineral acid - hypochlorite salt - chlorite salt process for generating chlorine dioxide and an apparatus therefor. In particular, the '761 patent describes a process wherein the three reactants are fed into a generating chamber to react and form chlorine dioxide and reaction by-products. The '761 patent teaches that relatively large quantities of water in the reactants are an important aspect of the disclosed method. In fact, the '761 patent teaches that water comprise from 95% to about 99.9% by weight or more of the total materials in the generator.

U.S. Pat. No. 4,143,115 describes another mineral acid - sodium hypochlorite - sodium chlorite process and apparatus for generating chlorine dioxide. Again, by weight, water comprises from 95% to 99.9% or more of the composition of materials in the generation vessel.

U.S. Pat. No. 4,247,531 describes an apparatus in which aqueous streams of the three reactants are drawn into a common manifold area by means of a partial vacuum or low pressure induced by a water stream driven venturi eductor. The venturi eductor is powered by a stream of water which also acts as a diluent and carrier fluid for the reaction products of the chlorine dioxide generation process. The amount of water added to the chlorine dioxide product using the process and apparatus of the '531 patent is said to be less than the 99% water dilution found with other generation systems. The '531 patent teaches that materials other than water which are not reactable with and are compatible with $ClO_2$, such as inert gasses like nitrogen, can be used to both power the venturi eductor, and act as a carrier stream for the chlorine dioxide. However, water, because of its ready availability and low cost would appear to be the most likely carrier material.

In the field, it was found that the manifold area of the apparatus described in the '531 patent would rapidly become clogged with the alkaline salt by-products of chlorine dioxide generation, such as sodium chloride. To alleviate this problem when using the chlorine gas - metal chlorite salt route, a modified version of the '531 apparatus was developed. U.S. Pat. No. 4,590,057 describes a method and apparatus comprising a venturi eductor in communication with a common manifold into which are drawn by a reduced pressure caused by the venturi eductor the reactants for the generation of chlorine dioxide and a stream of bleed water to dilute and carry away the alkaline salt by-products of chlorine dioxide generation.

Yet another method and apparatus of producing chlorine dioxide by the mineral acid - sodium hypochlorite - sodium chlorite route has been known in the art since at least 1979 and is erroneously referred to as the "dry gas method" of chlorine dioxide generation. The "dry gas method" comprises reacting mineral acid, sodium hypochlorite and sodium chlorite in a stream of air and water, wherein the water is fed at a rate of from one quarter to one half gallon per minute. In treating a typical vat of rendered fat or tallow, the chlorine dioxide generator would be required to run for four to five hours, thus introducing from 60 to 150 gallons of water over and above that which is the natural reaction by-product of the chlorine dioxide generation process. It is clearly not a dry process, in spite of its name.

The so-called "dry gas method" was found to be inadequate in treating large quantities of rendered fat and tallow on account of the water added by the treatment process. Specifically, when the chlorine dioxide produced by the "dry gas method" was introduced to the rendered materials prior to centrifugal water separation treatment, the added water would cause the centrifuge to overload, allowing large amounts of water to be carried over into the rendered products. When the chlorine dioxide treatment was conducted in the storage vessel for the rendered material the natural gravity separation of the water was found to take an extremely long time. It is estimated that by standing it may take a week or longer to acheive good water separation with the quantities of rendered materials being treated. Those familiar with the fat and tallow industry will recognize that the presence of water in the rendered product reduces its quality and market value.

Adding water to the reaction stream results in an aqueous chlorine dioxide product stream, which may be acceptable for certain bleaching and oxidizing applications but may also be highly undesirable for others.

The present invention developed as a result of the requirement of a mid-western United States animal by-products processing plant to bleach large batch quantities of rendered fat and tallow by treatment with chlorine dioxide. It was found that the then known methods of generating chlorine dioxide were not entirely desirable to the fat rendering industry because of the large amount of water introduced to the rendered materials as a part of the effluent stream carrying the chlorine dioxide. Any water added to the rendered materials would have to be removed via a separation processes, such as centrifuging, before the rendered materials would be suitable for sale or shipment to customers. The added step of separating the water from the rendered materials would increase the cost of the fat and tallow products and would slow the overall production time. Therefore it was necessary to develop a process for generating chlorine dioxide which would add a minimum amount of water to the materials treated therewith.

To correct the problems associated with treating rendered materials with chlorine dioxide obtained by the "dry-gas method", the present invention was developed. In the present invention, the mineral acid, alkaline hypochlorite salt and chlorite salt reactants are combined in the presence of a moving stream of air, a carrier and reaction medium which is reactable with chlorine dioxide to the extreme degree of being explosive. As the reaction takes place, the reaction products are moved down stream under the influence of the air pressure.

SUMMARY OF THE INVENTION

The present invention relates to a method and apparatus for producing chlorine dioxide in a reaction medium comprising a gaseous carrier stream, wherein it is preferred that the gaseous carrier stream comprise air.

More specifically, the present invention relates to a method and apparatus for producing chlorine dioxide by the mineral acid - alkaline hypochlorite salt - alkaline chlorite salt route in a gaseous carrier stream, wherein it is preferred that the gaseous carrier stream comprise air.

The method of the invention comprises contacting mineral acid, alkaline metal hypochlorite salt and alkaline metal chlorite salt reactants under reaction conditions for generating chlorine dioxide in a flowing gaseous carrier/reaction medium stream, wherein said gaseous carrier stream flows at a predetermined volume and rate so that the concentration of chlorine dioxide in said gaseous carrier stream does not exceed 10% by weight of said gaseous carrier stream. It is preferred that the amount of water introduced in the gaseous carrier stream be kept to a minimum, particularly when the chlorine dioxide is to be used in applications which are sensitive to water.

The apparatus of the invention comprises a conduit having a gaseous carrier stream inlet means for introducing a gaseous carrier stream therein, a reaction zone in communication with said gaseous carrier inlet means, said reaction zone being in communication with reactant inlet means for introducing reactants for generating chlorine dioxide; and outlet means in communication with said reaction zone to exhaust the gaseous carrier stream and reaction products of the chlorine dioxide generation process from said reaction zone.

DETAILED DESCRIPTION OF THE INVENTION

The method of the invention comprises contacting mineral acid, alkaline metal hypochlorite salt and alkaline metal chlorite salt reactants under reaction conditions favorable for generating chlorine dioxide in a reaction medium comprising flowing gaseous carrier/reaction medium stream, wherein said gaseous carrier stream flows at a predetermined volume and rate such that the concentration of chlorine dioxide in said gaseous carrier stream does not exceed 10% by weight of said gaseous carrier stream. It is preferred that the amount of water present in the gaseous carrier stream be kept to a minimum, particularly when the chlorine dioxide is to be used in applications which are sensitive to water.

In the preferred embodiment of the method of the invention, the gaseous carrier stream comprises air; the mineral acid is one or more members selected from the group consisting of HCl, $H_2SO_4$, $HNO_3$ and $H_3PO_4$, with HCl being the most preferred mineral acid; the alkaline metal hypochlorite salt is one or more members selected from the group consisting of NaOCl, LiOCl, KOCl, RbOCl, CsOCl and FrOCl, with NaOCl being the most preferred hypochlorite salt; and the alkaline metal chlorite salt is one or more members selected from the group consisting of $NaClO_2$, $LiClO_2$, $KClO_2$, $RbClO_2$, $CsClO_2$ and $FrClO_2$, with $NaClO_2$ being the most preferred chlorite salt.

The amount of water introduced into the gaseous carrier stream should ideally be kept to a minimum, particularly when material being treated with chlorine dioxide is sensitive to water. It should be recognized by those of average skill in the art that the reactants for generating chlorine dioxide by the mineral acid - hypochlorite salt - chlorite salt route are normally used in the form of aqueous solutions. Moreover, water is a reaction by-product of this particular route for generating chlorine dioxide. Hence, a certain amount of water is incidentally added to the chlorine dioxide stream in the form of a diluent for the reactants and as a reaction by-product.

Dilution of the reactants will result in a greater amount of water entering the chlorine dioxide effluent stream and thus affect those applications of chlorine dioxide which are sensitive to water. To keep the amount of water introduced incidentally to the carrier stream at a minimum, it is preferred that the reactants used in the process of the invention be used in relatively concentrated solutions. Therefore, when the preferred reactants are used it is preferred that they be used in the form of aqueous solutions having concentrations of approximately the following:

hydrochloric acid . . . up to 30% by weight
sodium chlorite . . . up to 25% by weight*
sodium hypochlorite . . . up to 9% by weight

* Based on 100% active sodium chlorite. NaClO$_2$ is generally only 80% active. The balance being NaCl and other reaction by-products. See Ullmann's Encyclopedia of Industrial Chemistry, Volume A 6, pages 500-501, for further information on the production of sodium chlorite.

Those familiar with the art to which the present invention pertains will recognize that the reactants are available in more concentrated forms. Specifically, hydrochloric acid is generally available in concentrations around 50% by weight, sodium chlorite is available in concentrations of up to 50% by weight when in a hot solution and sodium hypochlorite is available in concentrations ranging up to 12-15% by weight, when freshly made. Using reactants having such high concentrations may present some problems in handling and effectively introducing the materials into the gaseous stream for reaction. For instance, sodium chlorite undergoes a phase change to become a solid when at concentrations higher than 25% by weight in water, especially as the temperature of the sodium chlorite approaches room temperature. Even though it may have a concentration of around 15% by weight when freshly reacted, sodium hypochlorite degrades rapidly to concentrations of only 5% by weight in water; the concentration of common household chlorine bleach. Strong acids at high concentrations present some very obvious handling problems. Therefore, while it is within the scope of the present invention to use the reactants in their most highly concentrated form to avoid the addition of water to the material being treated, the actual amount of dilution of the reactants will be determined by the sensitivity of the treated material to water. The preferred concentrations of reactants given above are to serve as a general guideline for most applications of chlorine dioxide with the caveat that some applications may be more or less water sensitive than others and thereby require more or less concentrated reactants.

The most critical aspect of the method of the present invention is maintaining the chlorine dioxide concentration at or below 10% by weight of the gaseous carrier stream. It is well known in the industry that chlorine dioxide is unstable and becomes spontaneously explosive in conditions of confinement and at concentrations above approximately 10% by weight in air. Chlorine dioxide must therefor be generated on site and used immediately.

The inventor discovered that a gas, particularly air, flowing in a stream at a sufficiently high rate, can act as a carrier stream in which the chlorine dioxide generation reaction can take place and which can further serve as a transport medium for the chlorine dioxide. Chlorine dioxide gas produced by this method is essentially free of water, except for that which is used as a diluent for the reactants and that which is the natural by-product of the chlorine dioxide generation process, thus making the process suitable for treating water sensitive materials.

Although it is believed that the present invention can be practiced with the upper levels of chlorine dioxide concentration reaching 10% by weight of the gaseous carrier stream, in order to maintain an ample margin of safety it is preferred that the concentration of chlorine dioxide in the carrier stream be maintained at up to 5% by weight. More preferably, the chlorine dioxide concentration in the carrier stream is maintained at up to 3% by weight.

There is no lower limit to the concentration of chlorine dioxide present in the carrier stream in practicing the invention. As a practical and economic matter, practitioners of the invention may find certain minimum levels of chlorine dioxide are not efficacious for a specific application or are not justifiable due to the time required to treat the quantities of materials involved. However, as a general guideline, a lower a level of approximately 0.05 to 1% by weight is the lower limit of chlorine dioxide in the gaseous carrier stream for most treatment applications. Therefore, chlorine dioxide can be present in the effluent stream in ranges from 0.05 to 10% by weight, preferably 0.05 to 5% by weight and most preferably from 0.05 to 3% by weight, the balance being reaction by products of the generation process and gaseous carrier stream, preferably air.

The apparatus of the invention comprises a conduit having a gaseous carrier stream inlet means for introducing a gaseous carrier stream into said conduit, a reaction zone wherein chlorine dioxide reactants contact each other under conditions for the generation of chlorine dioxide, said reaction zone being in communication with reactant inlet means for introducing mineral acid, hypochlorite salt and chlorite salt reactants and outlet means for passage of chlorine dioxide and the reaction by-products of the generation process carried in the gaseous carrier stream to the oxidation application. From the outlet means, the chlorine dioxide is typically distributed into a tank holding the material for oxidation treatment, the distribution of the treatment gas being accomplished by means of a sparger or other device for distributing chlorine dioxide throughout the material to be oxidized. The apparatus of the invention will be further illustrated by FIG. 1 and the description of the drawings presented below.

DESCRIPTION OF THE DRAWINGS

In FIG. 1, the apparatus for generating chlorine dioxide in a gaseous stream 1 is illustrated in schematic form.

Air, originating from a compressor, pump, blower or other means of inducing pressurization or movement of air is introduced to a gaseous carrier stream conduit 5 via gaseous carrier stream inlet 7.

Air flows into the reaction zone 9 of the conduit where it acts as a diluent and reaction medium for the reactants for chlorine dioxide generation. The reaction zone is in communication with reactant inlet means 29, 39, 49. The reactant inlet means themselves communicate via reactant conduits 27, 37, 47 with sources of chlorine dioxide generating reactants. Shown in FIG. 1, the reactants are hydrochloric acid, sodium hypochlorite and sodium chlorite. The reactant materials are typically stored in simple holding tanks for holding aqueous solutions of the reactants.

Metering pumps 25, 35, 45 induce and regulate the flow of the reactants to the reaction zone of the conduit. Optionally, valves 23, 33, 43 located between the metering pumps and reactant inlet means may be used to further control the flow of reactants to the reaction zone. It should be recognized by those skilled in the art that other means for inducing flow of the reactants to the reaction zone may be used in the apparatus. For example, other pumping means, or even a venturi eductor powered by the air in the gaseous carrier stream may be used to move the reactants.

Chlorine dioxide and the reaction by-products of the generation process flow with the gaseous carrier stream from the reaction zone toward the gaseous carrier outlet means 11. The gaseous carrier outlet means is preferable in communication with a sparger or other means of dispersing the chlorine dioxide and carrier stream throughout the material receiving oxidizing treatment.

Controlling the flow of the gaseous carrier stream is a critical aspect of the invention. As such, great attention is paid to devices for metering and monitoring the flow of the gaseous carrier stream and the flow of reactants.

A manual throttle valve 51 is located on the gaseous carrier stream inlet conduit 52 to allow simple manual control of the gaseous carrier stream. A flow pressure switch 53 monitors the pressure of air in the inlet conduit and is set to switch off the metering pumps 25, 35, 45 should the flow of air be interrupted or reduced below a pre-set "safe" level.

A solenoid valve 54 regulates the flow of air in the inlet conduit on command from pressure switch 53. The solenoid valve can operate in an on - off mode as a safety system or when a constant flow of chlorine dioxide is not required for the specific treatment application. Pressure gauge 55 and Rotameter-type of air-flow indicator 56 are used to inform the operator of the generator of the amount of gaseous carrier stream flowing through the inlet conduit. A ball check valve 57 prevents the back flow of chlorine dioxide and reactants from the conduit 5 and reaction zone 9 in the event of an imbalance in pressure in the system.

It will be apparent to those of average skill in the art that the various parameters of the system, e.g. conduit diameter, pressure of the carrier stream, volume of the carrier stream, reactant flow rates, etc. are all determinable using standard chemical engineering techniques and calculations. Because of the volatile nature of chlorine dioxide care must be taken to stay well within the concentrations for chlorine dioxide in the carrier stream as set forth in this application.

The materials for constructing a generator are also well known in the art and would be apparent to those of ordinary skill in this area of technology.

EXAMPLES

The following Examples present actual operating parameters and chlorine dioxide production rates for chlorine dioxide generators built and operated according to the present invention. Examples 1 and 2 relate to an experimental small-scale laboratory bench unit built and operated to test the theory of the invention. Examples 3 and 4 relate to a full-scale experimental generator unit which was used to treat rendered fat and tallow in 80,000 lb. vat batches under actual commercial conditions. For all Examples, air was used as the gaseous carrier stream reaction medium and the concentrations of the aqueous solutions of the reactants were as follows:

hydrochloric acid . . . 30% by weight
sodium chlorite . . . 25% by weight
sodium hypochlorite . . . 9% by weight

EXAMPLE 1

| | |
|---|---|
| Chlorine dioxide generation rate | 1.96 lbs/hour |
| Rate of gaseous carrier flow | 6–22 SCFM[1] |
| Pressure of gaseous carrier flow | 60 PSIG |
| Sodium Chlorite Feed Rate | 63.2 ml/minute |
| Sodium Hypochlorite Feed Rate | 64.1 ml/minute |
| Hydrochloric Acid Feed Rate | 24.5 ml/minute |
| % $ClO_2$ in carrier stream | 2.93%–.8% |
| Conversion Efficiency[2] | 93.2% |

[1]SCFM = Standard Cubic Feet per Minute (adjusted for altitude)
[2]Conversion efficiency is based on the theoretical conversion of sodium chlorite, wherein the reactants react stoichiometrically.

EXAMPLE 2

| | |
|---|---|
| Chlorine dioxide generation rate | 2.61 lbs/hour |
| Rate of gaseous carrier flow | 6–22 SCFM |
| Pressure of gaseous carrier | 60 PSIG |
| Sodium Chlorite Feed Rate | 84.2 ml/minute |
| Sodium Hypochlorite Feed Rate | 85.4 ml/minute |
| Hydrochloric Acid Feed Rate | 32.7 ml/minute |
| % $ClO_2$ in carrier stream | 3.9%–1.06% |
| Conversion Efficiency | 94.7% |

EXAMPLE 3

| | |
|---|---|
| Chlorine dioxide generation rate | 0.91 lbs/hour |
| Rate of gaseous carrier flow | 20 SCFM |
| Pressure of gaseous carrier | 75 PSIG |
| Sodium Chlorite Feed Rate | 29.2 ml/minute |
| Sodium Hypochlorite Feed Rate | 27.5 ml/minute |
| Hydrochloric Acid Feed Rate | 13.8 ml/minute |
| % $ClO_2$ in carrier stream | 0.4% |

EXAMPLE 4

| | |
|---|---|
| Chlorine dioxide generation rate | 9.0 lbs/hour |
| Rate of gaseous carrier flow | 35 SCFM |
| Pressure of gaseous carrier | 60 PSIG |
| Sodium Chlorite Feed Rate | 290.0 ml/minute |
| Sodium Hypochlorite Feed Rate | 290.0 ml/minute |
| Hydrochloric Acid Feed Rate | 102.0 ml/minute |
| % $ClO_2$ in carrier stream | 2.2% |

What is claimed is:

1. A method of generating chlorine dioxide comprising contacting mineral acid, alkaline hypochlorite salt and alkaline chlorite salt in a reaction medium comprising a flowing gaseous carrier stream under reaction conditions favorable for the generation of chlorine dioxide, wherein the flow rate of the gaseous reaction medium is controlled so that the concentration of chlorine dioxide produced by the reaction does not exceed 10% by weight of the gaseous carrier stream, and wherein said mineral acid, alkaline hypochlorite salt and alkaline chlorite salt are reacted in the form of aqueous solutions containing an amount of water sufficient to act as a diluent for the reactants and no further water is added to the reaction stream.

2. A method as claimed in claim 1, wherein said gaseous reaction medium is air.

3. A method as claimed in claim 2, wherein said mineral acid comprises one or more members selected from the group consisting of HCL, $H_2SO_4$, $HNO_3$, and $H_3PO_4$; said alkaline hypochlorite salt comprises one or more members selected from the group consisting of NaOCl, LiOCl, KOCl, RbOCl, CsOCl and FrOCl; and said alkaline chlorite salt comprises one or more members selected from the group consisting of $NaClO_2$, $LiClO_2$, $KClO_2$, $RbClO_2$, $CsClO_2$ and $FrClO_2$.

4. A method as claimed in claim 3, wherein said mineral acid is HCl, said alkaline hypochlorite salt is NaOCl, and said alkaline chlorite salt is $NaClO_2$.

5. A method as claimed in claim 3, wherein the concentration of chlorine dioxide in said gaseous carrier stream ranges from 0.05 to 10% by weight.

6. A method as claimed in claim 5, wherein the concentration of chlorine dioxide in said gaseous carrier stream ranges from 0.05 to 5% by weight.

7. A method as claimed in claim 6, wherein the concentration of chlorine dioxide in said gaseous carrier stream ranges from 0.05 to 3% by weight.

8. A method as claimed in claim 4, wherein said HCl is used in concentrations of up to 30% by weight in water, said $NaClO_2$ is used in concentrations of up to 25% by weight in water, and said NaOCl is used in concentrations of up to 9% by weight in water.

9. A method of generating chlorine dioxide comprising contacting aqueous solutions of hydrochloric acid, sodium chlorite and sodium hypochlorite chlorite in a reaction medium comprising a flowing gaseous carrier stream under reaction conditions favorable for the generation of chlorine dioxide, wherein the flow rate of the gaseous reaction medium is controlled so that the concentration of chlorine dioxide produced by the reaction does not exceed 10% by weight of the gaseous carrier stream, wherein said amount of water in said aqueous solutions is an amount sufficient to form a hydrochloric acid reactant solution of about 30% by weight, a sodium chlorite reactant solution of about 25% by weight and a sodium hypochlorite solution of about 9% by weight, wherein the concentration of the sodium chlorite solution is based on 100% active sodium chlorite and no further water is added.

10. A method as claimed in claim 9, wherein said gaseous reaction medium is air.

11. A method as claimed in claim 10, wherein the concentration of chlorine dioxide in said gaseous carrier stream preferably ranges from 0.05 to 5% by weight.

12. A method as claimed in claim 11, wherein the concentration of chlorine dioxide in said gaseous carrier stream preferably ranges from 0.05 to 3% by weight.

* * * * *